US012585975B2

(12) United States Patent (10) Patent No.: US 12,585,975 B2
Griffin et al. (45) Date of Patent: Mar. 24, 2026

(54) STATE MAPS FOR QUANTUM COMPUTING

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 857 days.

(21) Appl. No.: 17/889,936

(22) Filed: Aug. 17, 2022

(65) Prior Publication Data

US 2024/0062094 A1 Feb. 22, 2024

(51) Int. Cl.
*G06N 10/80* (2022.01)
*G06N 20/00* (2019.01)

(52) U.S. Cl.
CPC ............. *G06N 10/80* (2022.01); *G06N 20/00* (2019.01)

(58) Field of Classification Search
None
See application file for complete search history.

(56) References Cited

U.S. PATENT DOCUMENTS

| | | | |
|---|---|---|---|
| 10,592,216 | B1 | 3/2020 | Richardson et al. |
| 10,817,337 | B1 | 10/2020 | Richardson et al. |
| 11,086,665 | B2 | 8/2021 | Griffin et al. |
| 2007/0239366 | A1 * | 10/2007 | Hilton .................... G16C 10/00 |
| | | | 703/11 |
| 2009/0031308 | A1 * | 1/2009 | Busche ................... G06F 9/542 |
| | | | 707/999.107 |
| 2018/0123597 | A1 * | 5/2018 | Sete ........................ G06N 10/70 |
| 2019/0205790 | A1 | 7/2019 | Dukatz et al. |
| 2020/0074346 | A1 | 3/2020 | Griffin et al. |
| 2020/0117764 | A1 | 4/2020 | Zuccarelli et al. |
| 2020/0334107 | A1 * | 10/2020 | Katabarwa ............. G06N 10/20 |
| 2024/0330732 | A1 * | 10/2024 | Pisenti ................... G06N 10/40 |
| 2025/0298859 | A1 * | 9/2025 | Moreno Casares ..... G06F 17/11 |

OTHER PUBLICATIONS

Fingerhuth, Mark et al., "Open source software in quantum computing," PLoD One 13(12): e0208561, https://doi.org/10.1371/journal.pone.0208561, Dec. 20, 2018, 28 pages.

* cited by examiner

*Primary Examiner* — Ryan Barrett

(74) *Attorney, Agent, or Firm* — Dority & Manning, P.A.

(57) ABSTRACT

Examples relating to configuration of quantum computing devices using state maps are provided. In one example, data associated with one or more quantum service runs executed by a quantum computing device is obtained. A current state map for the quantum computing device is generated based at least in part on the data associated with the one or more quantum service runs. A simulated state map is generated based at least in part by performing a simulated execution of the one or more quantum service runs. A difference between the current state map and the simulated state map is determined. One or more configuration settings for the quantum computing device are determined based at least in part on the difference between the current state map and the simulated state map.

20 Claims, 7 Drawing Sheets

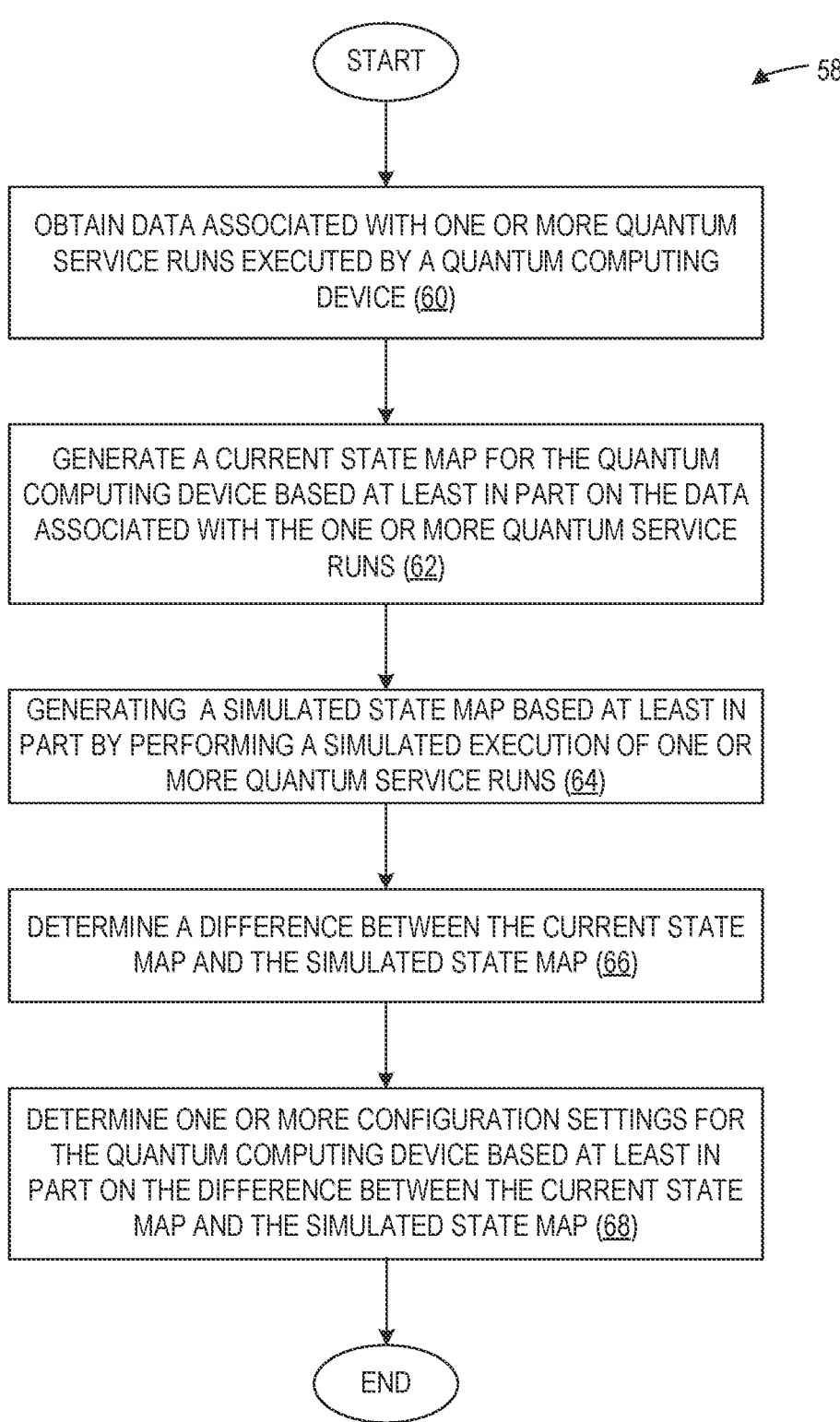

START

58

OBTAIN DATA ASSOCIATED WITH ONE OR MORE QUANTUM SERVICE RUNS EXECUTED BY A QUANTUM COMPUTING DEVICE (60)

GENERATE A CURRENT STATE MAP FOR THE QUANTUM COMPUTING DEVICE BASED AT LEAST IN PART ON THE DATA ASSOCIATED WITH THE ONE OR MORE QUANTUM SERVICE RUNS (62)

GENERATING A SIMULATED STATE MAP BASED AT LEAST IN PART BY PERFORMING A SIMULATED EXECUTION OF ONE OR MORE QUANTUM SERVICE RUNS (64)

DETERMINE A DIFFERENCE BETWEEN THE CURRENT STATE MAP AND THE SIMULATED STATE MAP (66)

DETERMINE ONE OR MORE CONFIGURATION SETTINGS FOR THE QUANTUM COMPUTING DEVICE BASED AT LEAST IN PART ON THE DIFFERENCE BETWEEN THE CURRENT STATE MAP AND THE SIMULATED STATE MAP (68)

END

FIG. 2

START

70

DETERMINE DIFFERENCE IN CURRENT STATE MAP AND SIMULATED STATE MAP (72)

GENERATE SIMULATIONS BASED ON ONE OR MORE CONFIGURATION SETTINGS (74)

DETERMINE DATA INDICATIVE OF A CHANGE IN DIFFERENCE FOR EACH OF THE SIMULATIONS (76)

GENERATE MODEL BASED ON THE DATA INDICATIVE OF THE CHANGE IN DIFFERENCE (78)

END

STATE MAPS FOR QUANTUM COMPUTING

BACKGROUND

Quantum computing involves the use of quantum bits, referred to herein as "qubits," which have characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit may not be described independently of the state of the other qubit.

SUMMARY

The examples disclosed herein relate to configuration of quantum computing devices using state maps. In one example, a method includes obtaining, by one or more computing devices, data associated with one or more quantum service runs executed by a quantum computing device. The method includes generating, by the one or more computing devices, a current state map for the quantum computing device based at least in part on the data associated with the one or more quantum service runs. The method includes generating, by the one or more computing devices, a simulated state map based at least in part by performing a simulated execution of the one or more quantum service runs. The method includes determining, by the one or more computing devices, a difference between the current state map and the simulated state map. The method includes determining, by the one or more computing devices, one or more configuration settings for the quantum computing device based at least in part on the difference between the current state map and the simulated state map.

In another example, a computing device includes a memory. The computing device includes a processor device coupled to the memory to obtain data associated with one or more quantum service runs executed by a quantum computing device. The processor device is to generate a current state map for the quantum computing device based at least in part on the data associated with the one or more quantum service runs. The processor device is to generate a simulated state map based at least in part by performing a simulated execution of the one or more quantum service runs. The processor device is to determine a difference between the current state map and the simulated state map. The processor device is to determine one or more configuration settings for the quantum computing device based at least in part on the difference between the current state map and the simulated state map.

In another example, a non-transitory computer-readable storage medium has stored thereon computer-executable instructions that, when executed, cause one or more processors devices to: obtain data associated with one or more quantum service runs executed by a quantum computing device; generate a current state map for the quantum computing device based at least in part on the data associated with the one or more quantum service runs; generate a simulated state map based at least in part by performing a simulated execution of the one or more quantum service runs; determine a difference between the current state map and the simulated state map; and determine one or more configuration settings for the quantum computing device based at least in part on the difference between the current state map and the simulated state map.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 depicts a flow chart of a method according to examples of the present disclosure.

DETAILED DESCRIPTION

Figure 1:
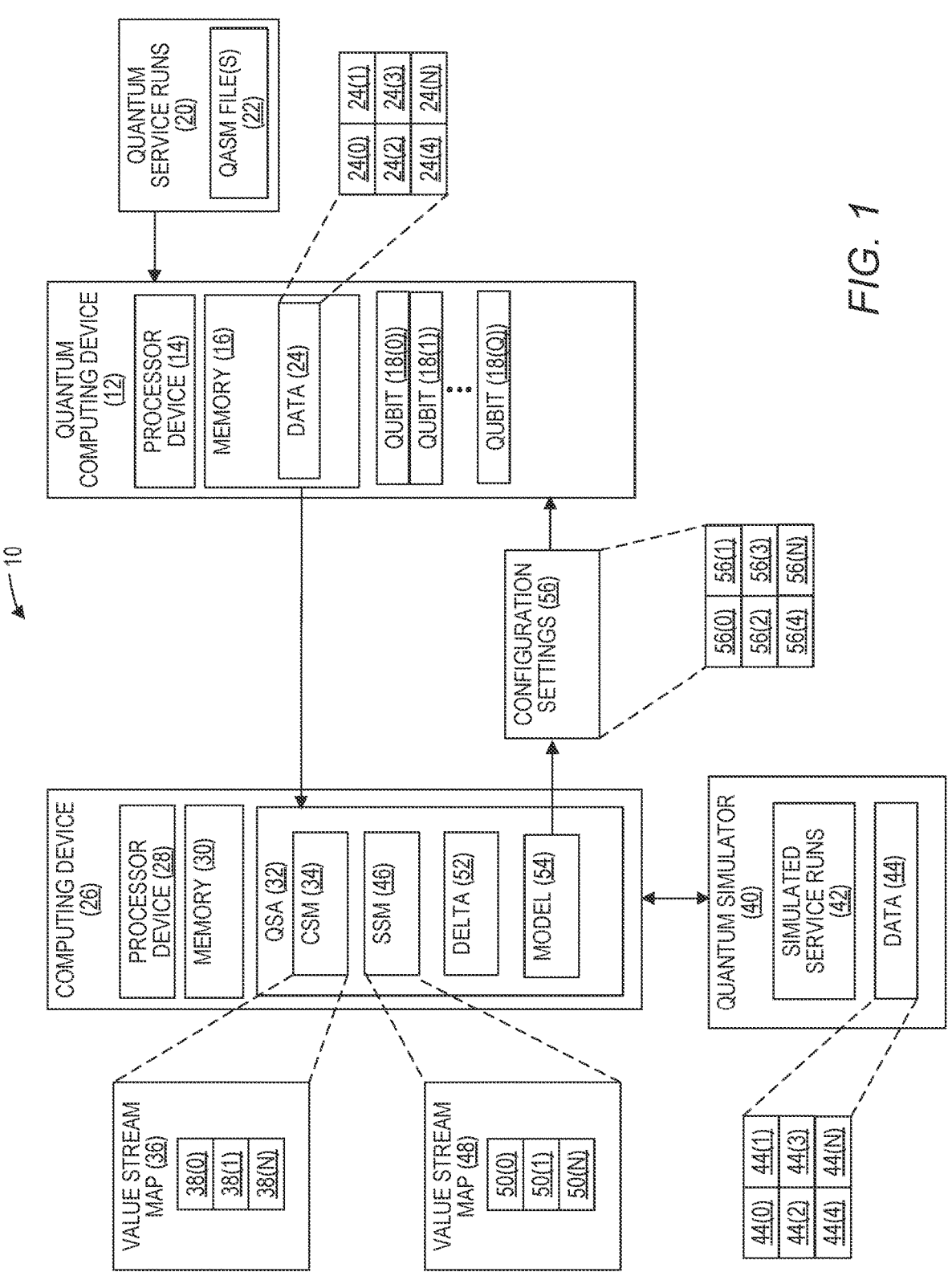
FIG. 1 depicts a system according to examples of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Finally, it is noted that while, for purposes of illustration and simplicity, the implementations are illustrated as being implemented by computer system that comprises a single computing device that in turn comprises a single processor device, in practice the examples/implementations disclosed herein may be implemented in a computer system that comprises any number of computing devices, each of which may comprise one or more processor devices. Thus, irrespective of the implementation, the examples/implementations may be implemented on a computer system that includes one or more computing devices, wherein the one or more computing devices comprise one or more processor devices, and the one or more processor devices implement functionality disclosed herein.

A quantum computing device may have sub-optimal operating conditions resulting from configuration and/or setup of the quantum computing device. For instance, errors and/or noise resulting from configuration and setup of qubits in the quantum computing device and/or during execution of quantum services by the quantum computing device may lead to performance losses, reducing the effectiveness of quantum computing capabilities. Indeed, in some instances, sub-optimal performance of the quantum computing devices may lead to classical computing being a better medium for executing certain quantum services when compared to the quantum computing devices. In this regard, quantum computing devices may need to be reconfigured or fine-tuned over the course of executing many quantum services to drive performance towards ideal operation of the quantum computing device.

According to examples, a quantum system analyzer (QSA) implemented by a classical computing device may obtain data associated with a plurality of quantum service runs executed by a quantum computing device. The data may be, for instance, data associated with a qubit state of a quantum computing device (e.g., polarization, spin, physical characteristics, etc.). The data may include recent errors and/or error percentages. The data may include logs and timing of execution steps. The data may include results of the most recent quantum service runs. The data may include actions performed on the qubits (e.g., teleportation, entanglement, storage, etc.). The data may include heat information and/or ambient temperature of the quantum computing device. The data may include qubit resource allocation of the quantum computing device. The data may include other data associated with the plurality of quantum service runs by the quantum computing device.

The QSA may generate a current state map based at least in part on the data associated with the plurality of quantum service runs. The current state map may be, for instance, a value stream map developed, for instance, using one or more lean centric or lean focused services. The current state map may provide, for instance, one or more benchmarks in, for instance, timestamp and/or error format to illustrate or provide information regarding process flows during the plurality of quantum service runs by the quantum computing device. The QSA may obtain the quantum service definition file (e.g., Quantum Assembly File (QASM file)) and data associated with the previous quantum service runs and implement a classical simulator to provide one or more simulated service runs. The simulated service runs may be associated with, for instance, reduced noise and ideal scenarios for implementation of the quantum service runs. The QSA may generate a simulated state map based at least in part on the simulated service runs. The simulated state map may provide, for instance, one or more benchmarks, for instance, in timestamp and/or error format to illustrate or provide information regarding process flows during the plurality of simulated service runs.

The QSA may determine a difference between the current state map and the simulated state map. The QSA may develop a model (e.g., a machine learned model) to determine configuration settings for the quantum computing device that reduce the difference between the current state map and the simulated state map to arrive as close to the simulated state map as possible. The QSA may configure the quantum computing device in accordance with the configuration settings so that future quantum service runs are implemented in closer to ideal state.

Aspects of the present disclosure may provide technical effects and benefits. For instance, the QSA may adjust configuration settings for quantum computing devices in an intelligent and learned manner to lead to more efficient and optimal operation of a quantum computing device with reduced noise and reduced error and/or with fewer computational resources. The reduced noise and reduced error in quantum computation may allow the quantum computing device to be used for execution of quantum services without repetition and/or degradation of data, leading to an improvement and the functionality of the quantum computing device itself and leading to increased computational resources available from the quantum computing device.

FIG. 1 is a block diagram of a system 10 in which examples may be practiced. The system 10 includes a quantum computing device 12. The quantum computing device 12 may include a processor device 14 and a memory 16. The quantum computing device 12 operates in quantum environments but is capable of operating using classical computing principles or quantum computing principles. When using quantum computing principles, the quantum computing device 12 performs computations that utilize quantum-mechanical phenomena, such as superposition and/or entanglement states. The quantum computing device 12 may operate under certain environmental conditions, such as at or near zero degrees (0°) Kelvin. When using classical computing principles, the quantum computing device 12 utilizes binary digits that have a value of either zero (0) or one (1).

In FIG. 1, the quantum computing device 12 may use qubits 18(0) . . . 18(Q), each of which has properties that differ from those of classical (i.e., non-quantum) bits used in classical computing. A qubit 18(0) . . . 18(Q) may encode quantum information for an underlying particle such as an atom or a photon and may possess characteristics that differ from those of classical (i.e., non-quantum) bits used in classical computing. For example, while a classical bit may be in a state of either one (1) or zero (0), a qubit 18(0) . . . 18(Q) may be in a "superposition" of both states simultaneously. A pair of qubits 18(0) . . . 18(Q) may also experience a physical phenomenon referred to as "entanglement," in which the quantum state of each qubit 18(0) . . . 18(Q) may not be described independently of the state of the other qubit 18(0) . . . 18(Q).

To maintain information for the qubits 18(0) . . . 18(Q), the quantum computing device 12 may include a qubit registry (not shown), which comprises a plurality of qubit registry entries each corresponding to a qubit, such one of qubits 18(0) . . . 18(Q). The qubit registry maintains and provides access to data relating to the qubits implemented by the quantum computing device 12, such as a count of the total number of qubits implemented by the quantum computing device 12 and a count of the number of available qubits that are currently available for allocation ("qubit resource allocation"), as non-limiting examples. Each of the qubit registry entries of the qubit registry also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state. Details concerning an example of the quantum computing device 12 will be set forth with respect to FIG. 7.

The quantum computing device 12 of FIG. 1 may execute one or more quantum services. A quantum service is a process that employs qubits such as the one or more qubits 18(0)-18(Q) to provide desired functionality. Each execution of a quantum service by the quantum computing device 12 is referred to herein as a quantum service run 20. Each quantum service run 20 may be associated with a series of process operations implemented by the quantum computing device 12 to execute the quantum service associated with the quantum service run 20. The process operations may identify qubits, preconfigure qubits, instantiate qubits, place them into specific quantum states and relationships, store values using the qubits, and/or subsequently deallocate and reuse the qubits to return a result for the quantum service.

Each quantum service associated with the quantum service runs 20 may be defined by a quantum service definition file 22. The quantum service definition file 22 may have a plurality of quantum programming instructions for allocating and manipulating qubits to achieve a desired functionality associated with the quantum service. The quantum service definition file 22 in some examples may comprise a Quantum Assembly File (QASM) file, as a non-limiting example. Each of the quantum service runs 20 may be associated with the same quantum service and the same quantum service definition file 22 or may be associated with different quantum services and different quantum service definition files 22.

Referring to FIG. 1, the quantum computing device 12 may obtain data associated with one or more quantum service runs 20 executed by the quantum computing device 12. The data 24 may include, for instance, one or more of the following data types 24(0) . . . 24(N). For instance, the data 24 may include data 24(0) associated with qubit state of the quantum computing device (e.g., polarization, spin, physical characteristics, etc.) at various stages of the processes implemented during one or more of the quantum service runs 20. The data 24 may include data 24(1) indicative of the most recent errors and/or error percentages during one or more of the quantum service runs 20. The data 24 may include data 24(2) indicative of logs and timing of execution steps during one or more of the quantum service runs 20. The data 24 may include data 24(3) indicative of results of one or more of the quantum service runs 20. The data 24 may include data 24(4) indicative of action(s) performed on the qubits (e.g., teleportation, entanglement, storage, etc.) during one or more quantum service runs 20. The data 24 may include other data 24(N) associated with the plurality of quantum service runs 20 by the quantum computing device 12 without deviating from the scope of the present disclosure, such as heat information for the quantum computing device 12 during the quantum service runs 20 and/or qubit resource allocation for quantum computing device 12. The quantum computing device 12 may store the data 24, for instance, in memory 16 for access by other quantum or classical computing devices (e.g., via an application programming interface or other suitable interface).

The system 10 may include a classical computing device 26 having a processor device 28 and a memory 30. The classical computing device 26 may implement a quantum system analyzer (QSA) 32. Details concerning an example computing device 26 are discussed with reference to FIG. 6.

Referring to FIG. 1, because the QSA 32 is a component of the computing device 26, functionality implemented by the QSA 32 may be attributed to the computing device 26 generally. Moreover, in examples where the QSA 32 comprises software instructions that program the processor device 28 to carry out functionality discussed herein; functionality implemented by the QSA 32 may be attributed herein to the processor device 28.

It is further noted that while the QSA 32 is shown as a single component, in other implementations, the QSA 32 may be implemented in a plurality of components. Finally, it is noted that while, for purposes of illustration and simplicity, the examples are illustrated as being implemented by a single processor device on a single computing device, in other environments, such as a distributed and/or clustered environment, and where the QSA 32 is implemented in multiple components, the QSA 32 may be implemented on a computer system that includes a plurality of processor devices of a plurality of different computing devices. Thus, irrespective of the implementation, the examples may be implemented on a computer system that includes one or more processor devices of one or more computing devices.

The QSA 32 may obtain data 24 associated with one or more quantum service runs 20 executed by the quantum computing device 12 from the quantum computing device 12 (e.g., via an application programming interface). The QSA may process the data 24 and generate a current state map (CSM) 34 for the quantum computing device 12 based on the data 24 associated with the one or more quantum service runs 20.

The CSM 34 may be a value stream map 36. The CSM 34 may provide a representation of the process flows of quantum service runs 20. The CSM 34 may be generated using, for instance, a lean centric service. The CSM may be generated and/or stored in any suitable format or data structure. The CSM 34 may be or may not be stored in a visual format that illustrates process flows of quantum service runs 20.

The CSM 34 may include a plurality of benchmarks 38(0), 38(1), . . . 38(N). In one example, each benchmark 38(0), 38(1), . . . 38(N) may be associated with a generic process operation across the plurality of quantum service runs 20, such as identification of qubits, pre-configuration qubits, instantiation qubits, placement of qubits into quantum states and relationships, storing values using the qubits, and/or subsequent deallocation of the qubits. Benchmarks 38(0), 38(1), . . . 38(N) may be associated with other suitable process operations without deviating from the present disclosure. Each benchmark 38(0), 38(1), . . . 38(N) may be a time-based benchmark, a performance-based benchmark (e.g., based on error), and/or resource-based benchmark.

For example, each benchmark 38(0), 38(1), . . . 38(N) may have an associated time or timestamp associated with a particular process operation. For illustrative example purposes, the CSM 34 may include three benchmarks 38(0), 38(1), . . . 38(N) associated with three generic process operations across the plurality of quantum service runs 20, such as, identification of qubits, placing qubits into quantum states or performing quantum operations (e.g., entanglement, teleportation), and deallocation of qubits. The time-based benchmarks 38(0), 38(1), . . . 38(N) may have an associated time stamp for each process operation. The time stamp for each benchmark 38(0), 38(1), . . . 38(N) may be, for instance, an average (mean, median, mode or other suitable statistical average) time stamp across all quantum service runs 20 to complete the process operation.

As another example, each benchmark 38(0), 38(1), . . . 38(N) may have an error rate or other performance-based metric associated with a particular process operation. For illustrative example purposes, the CSM 34 may include three benchmarks 38(0), 38(1), . . . 38(N) associated with three generic process operations across the plurality of quantum service runs 20, such as identification of qubits, placing qubits into quantum states or performing quantum operations (e.g., entanglement, teleportation), and deallocation of qubits. The performance-based benchmarks 38(0), 38(1), . . . 38(N) may have an associated error rate or other error metric for each process operation. The error rate or other performance-based metric for each benchmark 38(0), 38(1), . . . 38(N) may be, for instance, an average (mean, median, mode or other suitable statistical average) error rate across all quantum service runs 20 to complete the process operation.

As yet another example, each benchmark 38(1), 38(1), . . . 38(N) may have an associated resource-based metric associated with a particular process operation (e.g., qubit use metric, processor device use metric, or other resource-based metric). For illustrative example purposes, the CSM 34 may include three benchmarks 38(0), 38(1), . . . 38(N) associated with three generic process operations across the plurality of quantum service runs 20, such as identification of qubits, placing qubits into quantum states or performing quantum operations (e.g., entanglement, teleportation), and deallocation of qubits. The resource-based benchmarks 38(0), 38(1), . . . 38(N) may have an associated resource-based metric for each process operation. The resource-based metric for each benchmark 38(0), 38(1), . . . 38(N) may be, for instance, an average (mean, median, mode or other suitable statistical average) resource-based metric across all quantum service runs 20 to complete the process operation.

The QSA 32 may access a quantum simulator 40. The quantum simulator 40 may perform a classical simulation of the one or more quantum service runs 20 (e.g., based on a quantum service definition file(s) 22 associated with the quantum service runs 20) as simulated service runs 42. The simulated service runs 42 may be without error or with reduced error and/or with reduced decoherence issues associated with implementation of the quantum service runs by the quantum computing device 12.

The quantum simulator 40 may be implemented by a classical computing device having a processor device coupled to a memory. In one example, the quantum simulator 40 may be implemented by computing device 26.

The QSA 32 may obtain data 44 associated with the simulated service runs 42 from the quantum simulator 40 (e.g., via an application programming interface). The data 44 may include data 44(0) associated with a simulated state of qubits at various stages of the processes implemented during one or more of the simulated service runs 42. The data 44 may include data 44(1) indicative of simulated errors and/or error percentages during one or more of the simulated service runs 42. The data 44 may include data 44(2) indicative of logs and timing of execution steps during one or more of the simulated service runs 20. The data may include data 44(3) indicative of results of one or more of the simulated service runs 20. The data 44 may include data 44(4) indicative types of actions performed during one or more quantum service runs 42. The data 44 may include other data 44(N) associated with the plurality of simulated service runs 42 without deviating from the scope of the present disclosure, such as heat information for the quantum computing device 12 during the quantum service runs 20 and/or qubit resource allocation for quantum computing device 12.

The QSA 32 may process the data 44 and generate a simulated state map (SSM) 46 for the quantum computing device 12 based on the data 44. The SSM 46 may be a value stream map 48. The SSM 46 may provide a representation of the process flows of the simulated service runs 42. The SSM may be generated using, for instance, a lean centric service. The SSM 46 may be generated and/or stored in any suitable format or data structure. The SSM 46 may be or may not be stored in a visual format that illustrates process flows of simulated service runs 42.

The SSM 46 may include a plurality of benchmarks 50(0), 50(1), . . . 50(N). In one example, each benchmark 50(0), 50(1), . . . 50(N) may be associated with a generic process operation across the plurality of simulated service runs 42, such as identification of qubits, pre-configuration qubits, instantiation qubits, placement of qubits into quantum states and relationships, storing values using the qubits, and/or subsequently deallocation of the qubits. Benchmarks 50(0), 50(1), . . . 50(N) may be associated with other suitable process operations without deviating from the present disclosure. Each benchmark 50(0), 50(1), . . . 50(N) may be a time-based benchmark, a performance-based benchmark (e.g., based on error), and/or resource-based benchmark.

For example, each benchmark 50(0), 50(1), . . . 50(N) may have an associated time or timestamp associated with a particular process operation. For illustrative example purposes, the SSM 46 may include three benchmarks 50(0), 50(1), . . . 50(N) associated with three generic process operations across the plurality of simulated service runs 42, such as simulated identification of qubits, simulated placing qubits into quantum states or simulated quantum operations (e.g., entanglement, teleportation), and simulated deallocation of qubits. The time-based benchmarks 50(0), 50(1), . . . 50(N) may have an associated time stamp for each process operation. The time stamp for each benchmark 50(0), 50(1), . . . 50(N) may be, for instance, an average (mean, median, mode or other suitable statistical average) time stamp across all simulated service runs 42 to complete the process operation.

As another example, each benchmark 50(0), 50(1), . . . 50(N) may have an error rate or other performance-based metric associated with a particular process operation. or illustrative example purposes, the SSM 46 may include three benchmarks 50(0), 50(1), . . . 50(N) associated with three generic process operations across the plurality of simulated service runs 42, such as simulated identification of qubits, simulated placing qubits into quantum states or simulated quantum operations (e.g., entanglement, teleportation), and simulated deallocation of qubits. The performance-based benchmarks 50(0), 50(1), . . . 50(N) may have an associated error rate or other error metric for each process operation. The error rate or other performance-based metric for each benchmark 50(0), 50(1) . . . 50(N) may be, for instance, an average (mean, median, mode or other suitable statistical average) error rate across all simulated service runs 42 to complete the process operation.

As yet another example, each benchmark 50(0), 50(1), . . . 50(N) may have an associated resource-based metric associated with a particular process operation (e.g., qubit use metric, processor device use metric, or other resource-based metric). or illustrative example purposes, the SSM 46 may include three benchmarks 50(0), 50(1), . . . 50(N) associated with three generic process operations across the plurality of simulated service runs 42, such as simulated identification of qubits, simulated placing qubits into quantum states or simulated quantum operations (e.g., entanglement, teleportation), and simulated deallocation of qubits. The resource-based metric for each benchmark 50(0), 50(1), . . . 50(N) may be, for instance, an average (mean, median, mode or other suitable statistical average) resource-based metric across all simulated service runs 42 to complete the process operation.

The QSA 32 may determine a difference ("delta") 52 between the CSM and the SSM 46. For instance, the QSA 32 may determine any differences between benchmarks 38(0), 38(1), . . . 38(N) associated with the CSM 34 and benchmarks 50(0), 50(1), . . . 50(N) associated with the SSM 46. As an illustrative example, the QSA 32 may determine a difference between a time stamp, performance metric (e.g., error metric), and/or resource-based metric associated with benchmark 38(0) and benchmark 50(0) associated with a particular process operation (e.g., identification of qubits). In an example, the difference between all benchmarks in the CSM 34 and the SSM 46 may be stored in an array with separate values corresponding to the difference between each benchmark.

The QSA 32 may access a model 54 correlating the delta 52 with one or more configuration settings 56 for the quantum computing device 12. The configuration settings 56 may be specified in the model 54 to reduce the delta 52 between the CSM 34 and the SSM 46.

In some examples, the model 54 may be a machine-learned model. The model 54 may be trained using training data. In some examples, the training data may be generated, for instance, based simulations of different configurations (e.g., different configuration settings 56) of quantum computing device 12 using quantum simulator 40. The simulations may provide data indicative of a resulting change in the delta 52 based on a change in configuration settings of the quantum computing device 12. For instance, the model 54 may be based on simulations to determine an effect a change in one or more configuration settings 56 has on the delta 52 using, for instance, a random forest approach or other suitable learning technique.

In some examples, the model 54 may be a look up table. The look up table may be automatically generated by, for instance, the computing device 26. In some examples, the model 54 may be manually generated to correlate actions (e.g., configuration settings 56) for the quantum computing device 12 to address certain delta(s) 52 between the CSM 34 and the SSM 46. In this way, the model may be customizable to prioritize certain changes in configuration settings 56 over others based on environmental factors, convenience factors, or other factors.

The QSA 32 may determine one or more configuration settings 56 based on the model 54. For instance, in the example where the model 54 is a machine-learned model, the QSA 32 may provide the delta 52 as an input to the model 54 and receive one or more configuration settings 56 as an output of the model 54. In the example where the model 54 is a look up table or similar correlation, the QSA 32 may identify the one or more configuration settings 56 associated with (e.g., correlated with) the delta 52 in the model 54.

The QSA 32 may provide the configuration settings 56 to the quantum computing device 12 to configure the quantum computing device 12 based on the configuration settings 56. In examples, the one or more configuration settings may be, for instance, a configuration setting 56(0) associated with qubit load capacity. The one or more configuration settings 56 may be, for instance, a configuration setting 56(1) associated with number of available qubits. The one or more configuration settings 56 may be, for instance, a configuration setting 56(2) associated with resetting of qubits between runs. The one or more configuration settings 56 may be, for instance, a configuration setting 56(3) associated with ambient temperature of the quantum computing device 12. The one or more configuration settings 56 may be, for instance, a configuration setting 56(4) associated with an error correction scheme. The one or more configuration settings 56 may be, for instance, a configuration setting 56(N) associated with another operating parameter or characteristic of the quantum computing device 12 without deviating from the scope of the present disclosure.

FIG. 2 is a flow chart 58 of an example method according to example implementations of the present disclosure. FIG. 2 may be implemented using one or more computing devices, such as computing device 26 of FIG. 1. Elements of FIG. 1 are referenced in describing FIG. 2 for the sake of clarity. It is to be understood that, in some examples, some operations illustrated in FIG. 2 may be performed in an order other than illustrated herein, include operations not illustrated, and/or may be omitted.

In FIG. 2, the computing device 26 (e.g., the QSA 32) may obtain data associated with one or more quantum service runs 20 executed by a quantum computing device 12 (Block 60). The data 24 may include, for instance, one or more of the following data types 24(0) . . . 24(N). For instance, the data 24 may include data 24(0) associated with a qubit state of the quantum computing device (e.g., polarization, spin, physical characteristics, etc.) at various stages of the processes implemented during one or more of the quantum service runs 20. The data 24 may include data 24(1) indicative of the most recent errors and/or error percentages during one or more of the quantum service runs 20. The data 24 may include data 24(2) indicative of logs and timing of execution steps during one or more of the quantum service runs 20. The data 24 may include data 24(3) indicative of results of one or more of the quantum service runs 20. The data 24 may include data 24(4) indicative types of actions performed on the qubits (e.g., teleportation, entanglement, storage, etc.) during one or more quantum service runs 20. The data 24 may include other data 24(N) associated with the plurality of quantum service runs 20 by the quantum computing device 12 without deviating from the scope of the present disclosure, such as heat information for the quantum computing device 12 during the quantum service runs 20 and/or qubit resource allocation for quantum computing device 12.

The computing device 26 (e.g., the QSA 32) may generate a current state map (CSM) 34 for the quantum computing device 12 based at least in part on the data 24 associated with the one or more quantum service runs 20 executed by the quantum computing device 12 (Block 62). The CSM 34 may be a value stream map 36. The CSM 36 may include one or more benchmarks 38(0), 38(1), . . . 38(N). The benchmarks 38(0), 38(1), . . . 38(N) may be time-based benchmarks, performance-based benchmarks, and/or resource-based benchmarks.

The computing device 26 (e.g., the QSA 32) may generate a simulated state map (SSM) 46 based at least in part by performing a simulated execution of one or more quantum service run 20 (e.g., using quantum simulator 40) (Block 64). The SSM 46 may be a value stream map 48. The SSM 46 may include one or more benchmarks 50(0), 50(1), . . . 50(N). The benchmarks 50(0), 50(1), . . . 50(N) may be time-based benchmarks, performance-based benchmarks, and/or resource-based benchmarks.

The computing device 26 (e.g., the QSA 32) may determine a difference (e.g., delta 52) between the CSM 34 and the SSM 46 (Block 66). For instance, the computing device 26 may determine any differences between benchmarks

38(0), 38(1), . . . 38(N) associated with the CSM 34 and benchmarks 50(0), 50(1), . . . 50(N) associated with the SSM 46.

The computing device 26 (e.g., the QSA 32) may determine one or more configuration settings 56 for the quantum computing device 12 based at least in part on the difference between the CSM 34 and the SSM 46 (Block 68). For instance, the computing device 26 (e.g., the QSA 32) may determine the one or more configuration settings 56 based at least in part on a model 54 correlating the difference between the CSM 34 and the SSM 46 with the one or more configuration settings 56. In some examples, the model 54 may be a machine-learned model. In some examples, the model 54 may be a look up table.

Figure 3:
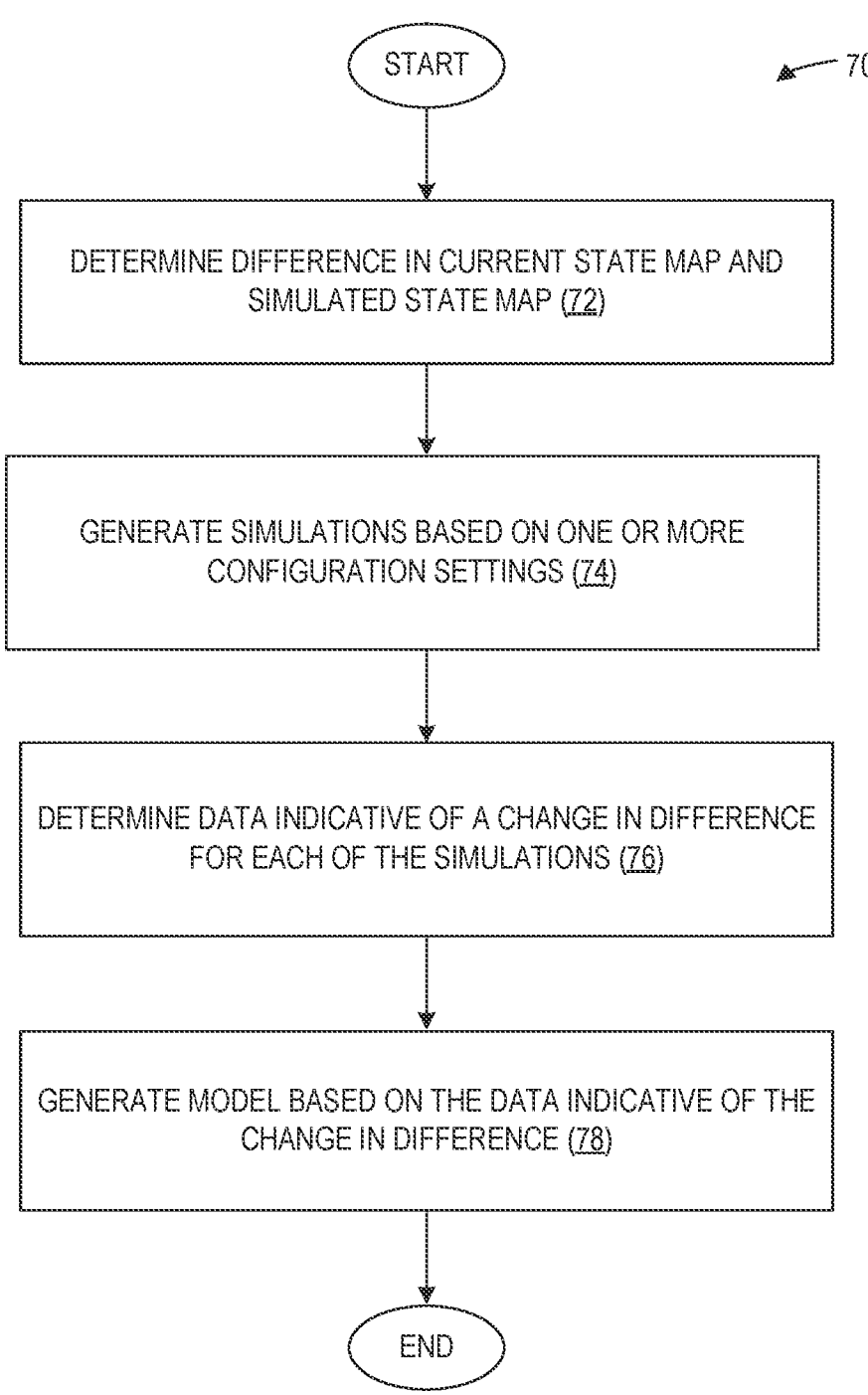
FIG. 3 depicts a flow chart of a method according to examples of the present disclosure.

FIG. 3 is a flow chart 70 of an example method according to example implementations of the present disclosure. FIG. 3 may be implemented using one or more computing devices, such as computing device 26 of FIG. 1. Elements of FIG. 1 are referenced in describing FIG. 3 for the sake of clarity. It is to be understood that, in some examples, some operations illustrated in FIG. 3 may be performed in an order other than illustrated herein, include operations not illustrated, and/or may be omitted.

In FIG. 3, the computing device 26 (e.g., the QSA 32) may determine a difference (e.g., delta 52) between the CSM 34 and the SSM 46 (Block 72). For instance, the computing device 26 may determine any differences between benchmarks 38(0), 38(1), . . . 38(N) associated with the CSM 34 and benchmarks 50(0), 50(1), . . . 50(N) associated with the SSM 46.

The computing device 26 (e.g., the QSA 32) may generate one or more simulations (e.g., using quantum simulator 40) based on one or more different sets of configuration settings 56 of the quantum computing device 12 (Block 74). The computing device 26 (e.g., the QSA 32) may determine data indicative of a change in the difference (e.g., delta 52) between the CSM 34 and the SSM 46 for each of the simulations (Block 76). The data indicative of the change in difference (e.g., delta 52) may be indicative of how a change in certain configuration settings 56 for the quantum computing device 12 effects the change in difference between the CSM 34 and the SSM 46.

The computing device 26 (e.g., the QSA 32) may generate the model based on the data indicative of the change in the difference (e.g., delta 52) between the CSM 34 and the SSM 46 for each of the simulations (Block 78). For example, the data indicative of the change in the difference (e.g., delta 52) may be used as training data to train a machine-learned model. As another example, the data indicative of the change in difference (e.g., delta 52) may be used to inform generation of a look up table.

Figure 4:
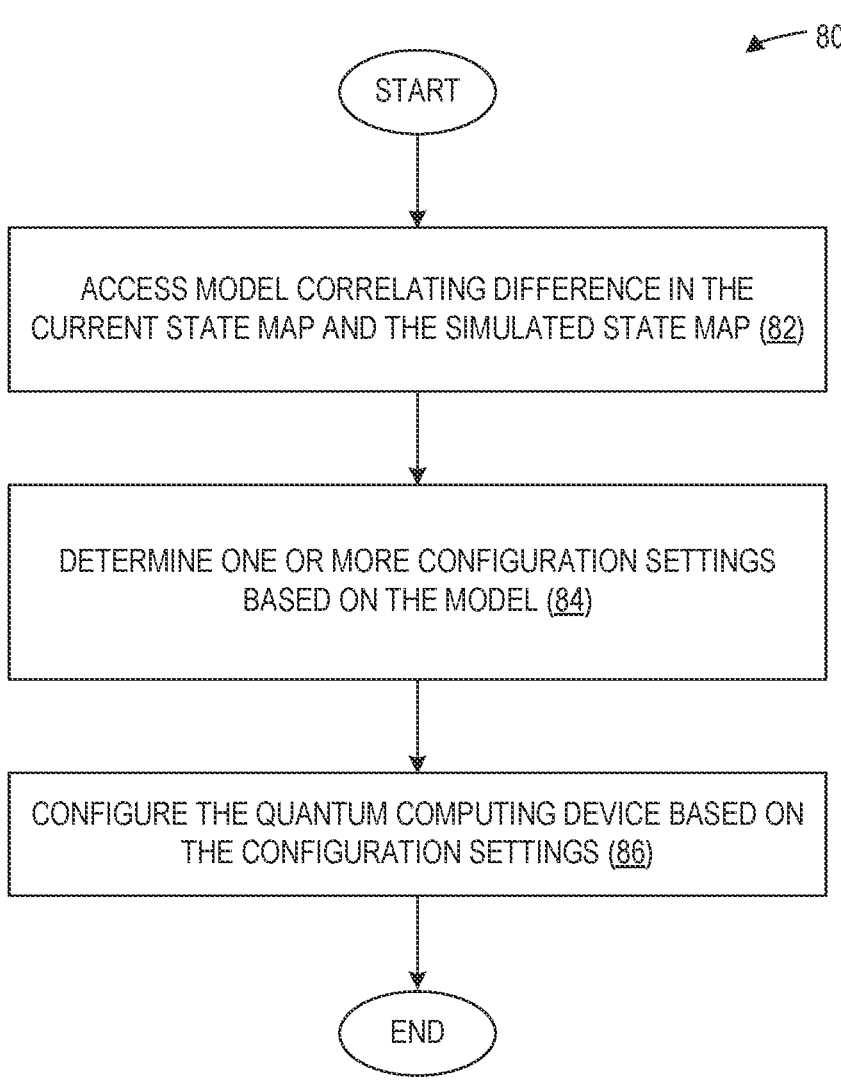
FIG. 4 depicts a flow chart of a method according to examples of the present disclosure.

FIG. 4 is a flow chart 80 of an example method according to example implementations of the present disclosure. FIG. 4 may be implemented using one or more computing devices, such as computing device 26 of FIG. 1. Elements of FIG. 1 are referenced in describing FIG. 4 for the sake of clarity. It is to be understood that, in some examples, some operations illustrated in FIG. 4 may be performed in an order other than illustrated herein, include operations not illustrated, and/or may be omitted.

In FIG. 4, the computing device 26 (e.g., the QSA 32) may access the model 54 correlating the difference (e.g., delta 52) in the CSM 34 and the SSM (Block 82). The computing device 26 (e.g., the QSA 32) may determine one or more configuration settings 56 based on the model 54. (Block 84). For instance, in the example where the model 54 is a machine-learned model, the computing device 26 (e.g., the QSA 32) may provide the delta 52 as an input to the model and receive one or more configuration settings 56 as an output of the model 54. In the example where the model 54 is a look up table or similar correlation, the computing device 26 (e.g., the QSA 32) may identify the one or more configuration settings 56 associated with (e.g., correlated with) the delta 52 in the model 54.

The computing device 26 (e.g., the QSA 32) may configure the quantum computing device 12 based on the one or more configuration settings (Block 86). For instance, the computing device 26 may provide (e.g., communicate) data indicative of the one or more configuration settings 56 to the quantum computing device 12, for instance, via an application programming interface. The quantum computing device 12 may adjust its settings and operating parameters according to the configuration settings 56.

Figure 5:
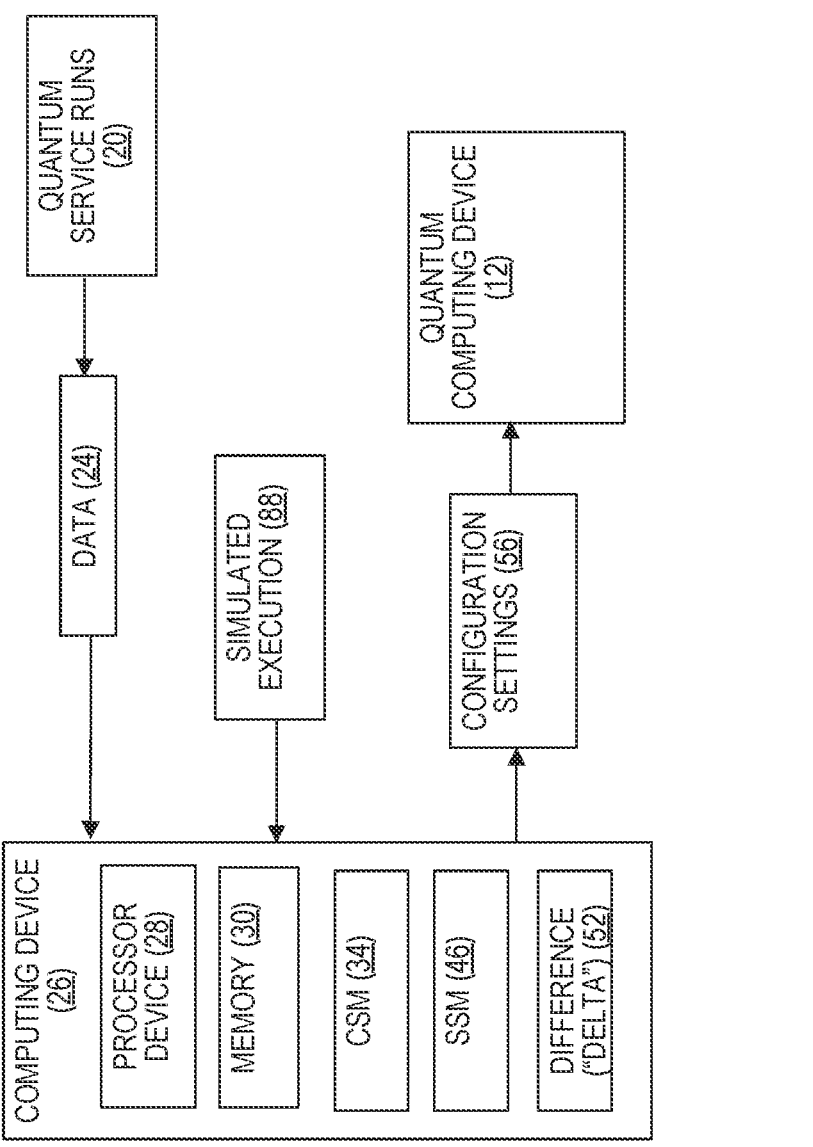
FIG. 5 depicts a system according to examples of the present disclosure.

FIG. 5 depicts a simplified diagram of a computing device 26 according to example implementations of the present disclosure. The computing device includes a memory 30. The computing device includes a processor device 28 coupled to the memory 30 to obtain data 24 associated with one or more quantum service runs 20 executed by a quantum computing device 12. The processor device 28 is to generate a current state map (CSM) 34 for the quantum computing device 12 based at least in part on the data 24 associated with the one or more quantum service runs 20. The processor device 28 is to generate a simulated state map (SSM) 46 based at least in part by performing a simulated execution 88 of the one or more quantum service runs 20. The processor device is to determine a difference (delta) 52 between the current state map 34 and the simulated state map 46. The processor device 28 is to determine one or more configuration settings 56 for the quantum computing device 12 based at least in part on the difference (delta) 52 between the current state map and the simulated state map 46.

Figure 6:
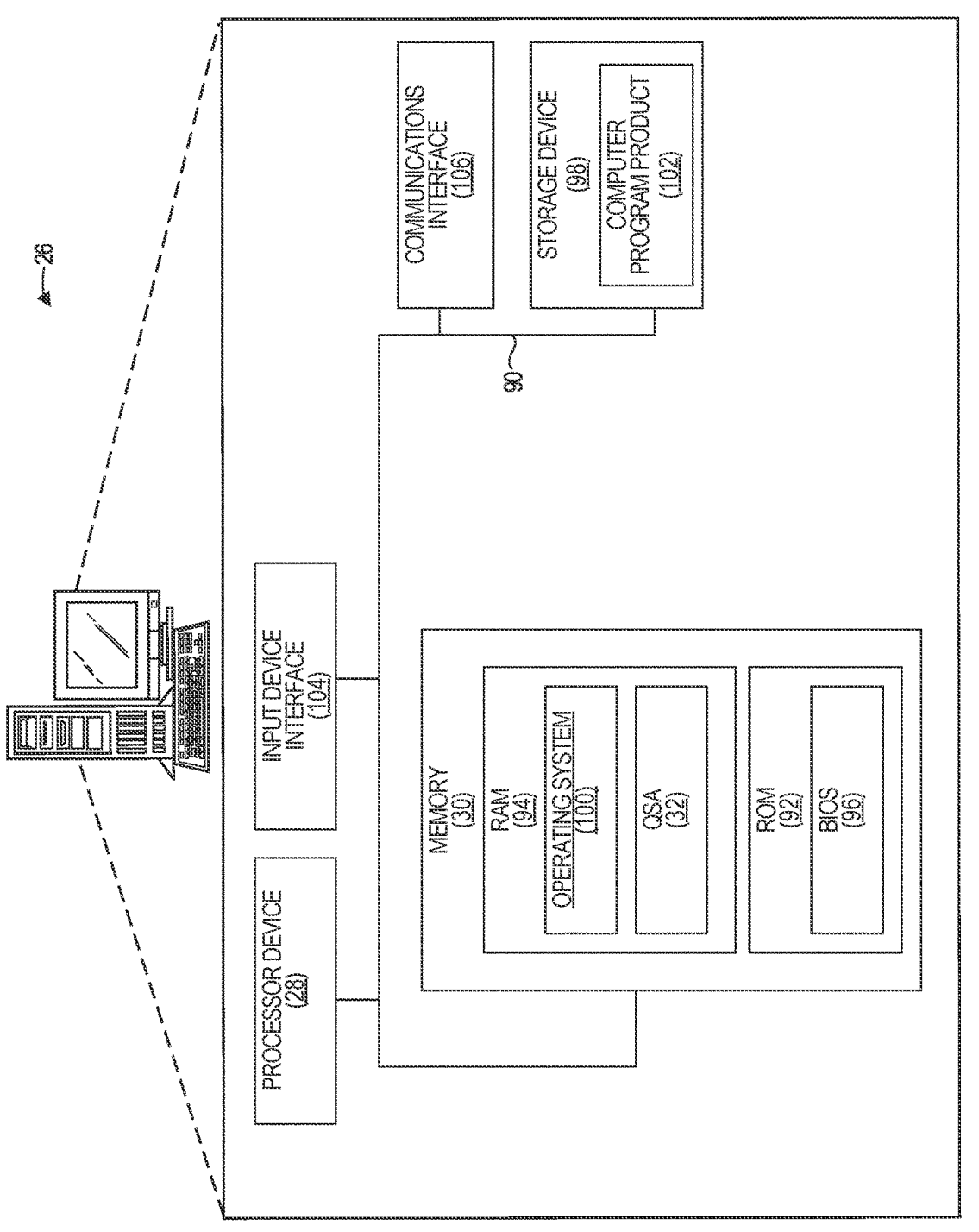
FIG. 6 depicts an example computing device to implement examples according to the present disclosure.

FIG. 6 is a block diagram of the computing device 26 suitable for implementing examples. FIG. 6 is representative of computing device 26 for purposes of illustration. FIG. 6 may also be representative of other computing devices that may be used in conjunction with examples. The computing device may comprise any computing or electronic device capable of including firmware, hardware, and/or executing software instructions to implement the functionality described herein, such as a computer server, a desktop computing device, a laptop computing device, or the like. The computing device 26 includes the processor device 28, the memory 30, and a system bus 90. The system bus provides an interface for system components including, but not limited to, the memory 30 and the processor device 28. The processor device 28 may be any commercially available or proprietary processor.

The memory 30 may include non-volatile memory 92 (e.g., read-only memory (ROM), erasable programmable read-only memory (EPROM), electrically erasable programmable read-only memory (EEPROM), etc.), and volatile memory 94 (e.g., random-access memory (RAM)). A basic input/output system (BIOS) 96 may be stored in the non-volatile memory 92 and may include the basic routines that help to transfer information between elements within the computing device 26. The volatile memory 94 may also include a high-speed RAM, such as static RAM, for caching data.

The computing device 26 may further include or be coupled to a non-transitory computer-readable storage medium such as the storage device 98, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 98 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A few modules may be stored in the storage device 98 and in the volatile memory 94, including an operating system 100 and one or more program modules, such as the QSA 32, which may implement the functionality described herein in whole or in part.

All or a portion of the examples may be implemented as a computer program product 102 stored on a transitory or non-transitory computer-usable or computer-readable storage medium, such as the storage device 98, which includes complex programming instructions, such as complex computer-readable program code, to cause the processor device 28 to carry out the steps described herein. Thus, the computer-readable program code may comprise software instructions for implementing the functionality of the examples described herein when executed on the processor device 28. The processor device 28, in conjunction with the QSA 32 in the volatile memory 94, may serve as a controller, or control system, for the computing device 26 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 28 through an input device interface 104 that is coupled to the system bus 90 but may be connected by other interfaces such as a parallel port, an Institute of Electrical and Electronic Engineers (IEEE) 1394 serial port, a Universal Serial Bus (USB) port, an IR interface, and the like.

The computing device 28 may also include a communications interface suitable for communicating with a network or other devices as appropriate or desired.

Figure 7:
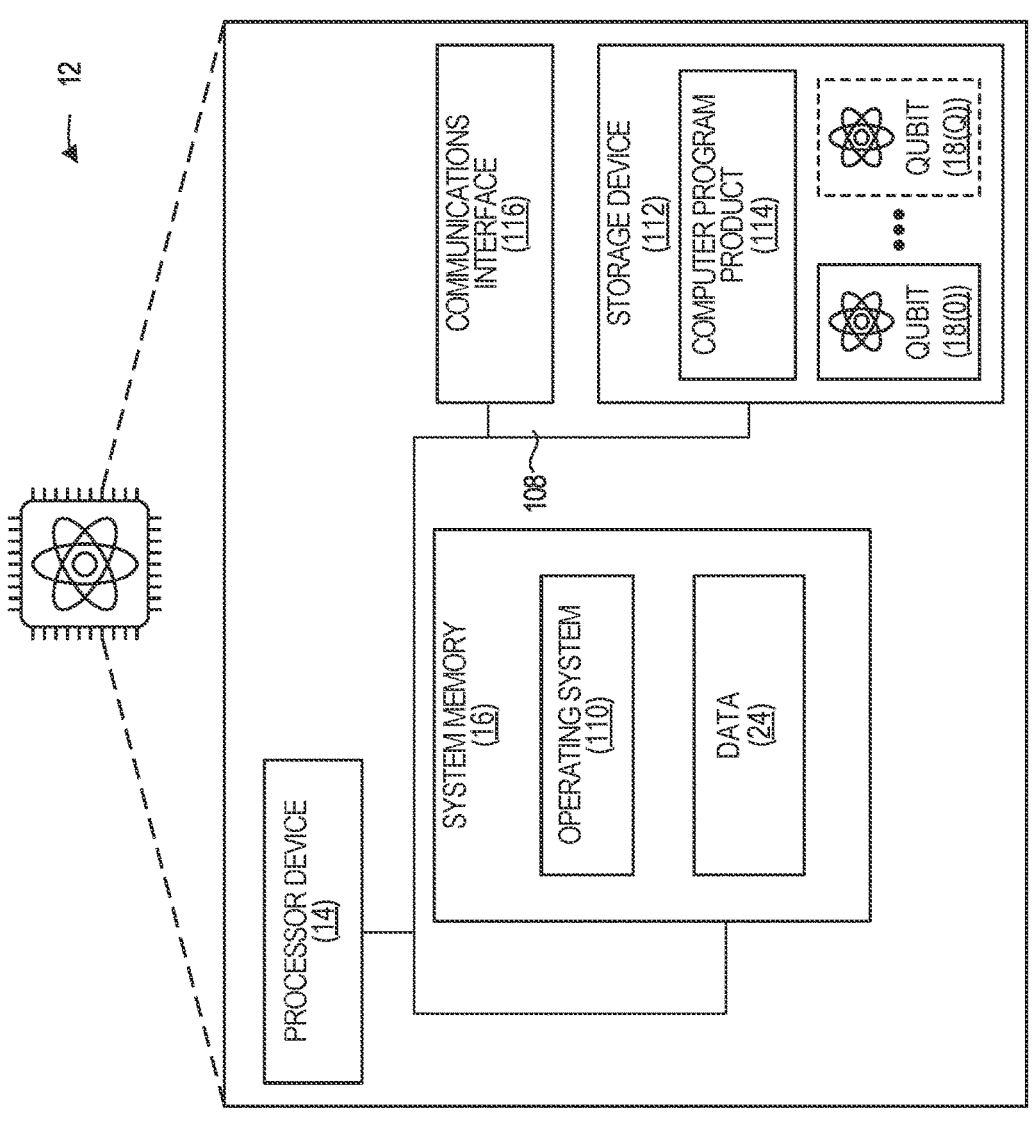
FIG. 7 depicts an example quantum computing device to implement examples according to the present disclosure.

FIG. 7 is a block diagram of a quantum computing device 12 suitable for implementing examples according to example implementations. The quantum computing device 12 may comprise any computing or electronic device capable of including firmware, hardware, and/or executing software instructions to implement the functionality described herein in a quantum environment. The quantum computing device 12 includes one or more processor device(s) 14, one or more memory device(s) 16 and a system bus 108. The system bus 108 provides an interface for system components including, but not limited to, the one or more memory device(s) 16 and the one or more processor device(s) 14. The one or more processor device(s) 14 may be any commercially available or proprietary processor suitable for operating in a quantum environment. The one or more memory device(s) 16 may store computer-readable instructions associated with an operating system 110. The one or more memory device(s) 16 may store data, such as data 24 associated with one or more quantum service runs 20.

The quantum computing device 12 may further include or be coupled to a non-transitory computer-readable storage medium such as a storage device 112. The storage device

112 and other drives associated with computer-readable media and computer-usable media may provide non-volatile storage of data, data structures, computer-executable instructions, and the like. The storage device may also store one or more qubits 18(0)-18(Q), which may be measured and/or manipulated by the one or more processor device(s) 14 when performing quantum computing operations.

All or a portion of the examples may be implemented as a computer program product 114 stored on a transitory or non-transitory computer-usable or computer-readable storage medium, such as the storage device 112, which includes complex programming instructions, such as complex computer-readable program code, to cause the one or more processor devices 14 to carry out the functionality described herein. Thus, the computer-readable program code may comprise software instructions for implementing the functionality of the examples described herein when executed on the one or more processor devices 14.

An operator may also be able to enter one or more configuration commands through a keyboard (not illustrated), a pointing device such as a mouse (not illustrated), or a touch-sensitive surface (not illustrated). The quantum computing device 12 may also include a communications interface 116 suitable for communicating with other computing devices, including, in some implementations, classical computing devices and/or quantum computing devices.

Individuals will recognize improvements and modifications to the preferred examples of the disclosure. All such improvements and modifications are considered within the scope of the concepts disclosed herein and the claims that follow.

The invention claimed is:

1. A method, comprising:

obtaining, by one or more computing devices, data associated with one or more quantum service runs executed by a quantum computing device;

generating, by the one or more computing devices, a current state map for the quantum computing device based at least in part on the data associated with the one or more quantum service runs;

generating, by the one or more computing devices, a simulated state map based at least in part on a simulated execution of the one or more quantum service runs, wherein the simulated execution is simulated by a classical computing device;

determining, by the one or more computing devices, a difference between the current state map and the simulated state map;

determining, by the one or more computing devices, one or more configuration settings for the quantum computing device based at least in part on the difference between the current state map and the simulated state map; and causing, by the one or more computing devices, the quantum computing device to execute a subsequent quantum service run based on the one or more configuration settings.

2. The method of claim 1, wherein causing the quantum computing device to execute the subsequent quantum service run comprises:

configuring, by the one or more computing devices, the quantum computing device based at least in part on the one or more configuration settings.

3. The method of claim 1, where the data associated with one or more quantum service runs comprises data associated with one or more of qubit state, an error, an error percentage, heat in the quantum computing system device, execution timing of the one or more quantum service runs, action executed during the one or more quantum service runs, or qubit resource allocation.

4. The method of claim 1, wherein the current state map comprises one or more first benchmarks and the simulated state map comprises one or more second benchmarks.

5. The method of claim 4, wherein the difference between the current state map and the simulated state map is based at least in part on a difference between the one or more first benchmarks and the one or more second benchmarks.

6. The method of claim 4, wherein the one or more first benchmarks and the one or more second benchmarks are time-based benchmarks, performance-based benchmarks, or resource-based benchmarks.

7. The method of claim 1, further comprising generating, by the one or more computing devices, a model correlating a change in the one or more configuration settings versus the difference between the current state map and the simulated state map.

8. The method of claim 7, wherein the model comprises a machine-learned model.

9. The method of claim 7, wherein the model comprises a look up table.

10. The method of claim 1, wherein the one or more configuration settings comprise one or more of qubit load capacity, number of available qubits, resetting of qubits between runs, or ambient temperature.

11. The method of claim 1, wherein the current state map comprises a value stream map.

12. The method of claim 1, wherein the one or more computing devices comprise the classical computing device simulated execution is implemented using a classical computing device.

13. A computing device comprising:
a memory; and
a processor device coupled to the memory to:
obtain data associated with one or more quantum service runs executed by a quantum computing device;
generate a current state map for the quantum computing device based at least in part on the data associated with the one or more quantum service runs;
generate a simulated state map based at least in part on a simulated execution of the one or more quantum service runs, wherein the simulated execution is simulated by a classical computing device;
determine a difference between the current state map and the simulated state map;
determine one or more configuration settings for the quantum computing device based at least in part on the difference between the current state map and the simulated state map; and
cause the quantum computing device to execute a subsequent quantum service run based on the one or more configuration settings.

14. The computing device of claim 13, wherein, to cause the quantum computing device to execute the subsequent quantum service run, the processor device is to:

configure the quantum computing device based at least in part on the one or more configuration settings.

15. The computing device of claim 13, wherein the current state map comprises one or more first benchmarks and the simulated state map comprises one or more second benchmarks, wherein the difference between the current state map and the simulated state map is based at least in part on a difference between the one or more first benchmarks and the one or more second benchmarks.

16. The computing device of claim 13, wherein the processor device is further to:
generate a model correlating a change in the one or more configuration settings versus the difference between the current state map and the simulated state map.

17. The computing device of claim 13, wherein the computing device comprises the classical computing device.

18. A non-transitory computer-readable storage medium having stored thereon computer-executable instructions that, when executed, cause one or more processor devices to:
obtain data associated with one or more quantum service runs executed by a quantum computing device;
generate a current state map for the quantum computing device based at least in part on the data associated with the one or more quantum service runs;
generate a simulated state map based at least in part on a simulated execution of the one or more quantum service runs, wherein the simulated execution is simulated by a classical computing device;
determine a difference between the current state map and the simulated state map;
determine one or more configuration settings for the quantum computing device based at least in part on the difference between the current state map and the simulated state map; and
cause the quantum computing device to execute a subsequent quantum service run based on the one or more configuration settings.

19. The non-transitory computer-readable storage medium of claim 18,
wherein, to cause the quantum computing device to execute the subsequent quantum service run, the computer-executable instructions, when executed, cause the one or more processor devices to:
configure the quantum computing device according to based at least in part on the one or more configuration settings.

20. The non-transitory computer-readable storage medium of claim 18, wherein the current state map comprises one or more first benchmarks and the simulated state map comprises one or more second benchmarks, wherein the difference between the current state map and the simulated state map is based at least in part on a difference between the one or more first benchmarks and the one or more second benchmarks.

* * * * *